E. S. SYLVESTER.
PNEUMATIC CUSHION.
APPLICATION FILED MAY 12, 1916.

1,332,933.

Patented Mar. 9, 1920.

WITNESS:

INVENTOR
E. S. Sylvester,
BY
HIS ATTORNEY

UNITED STATES PATENT OFFICE.

EDWIN S. SYLVESTER, OF WEST NEW BRIGHTON, NEW YORK, ASSIGNOR TO RUBBER REGENERATING COMPANY, A CORPORATION OF INDIANA.

PNEUMATIC CUSHION.

1,332,933.   Specification of Letters Patent.   Patented Mar. 9, 1920.

Application filed May 12, 1916. Serial No. 96,965.

*To all whom it may concern:*

Be it known that I, EDWIN S. SYLVESTER, a citizen of the United States, residing at West New Brighton, county of Richmond, and State of New York, have invented certain new and useful Improvements in Pneumatic Cushions, of which the following is a full, clear, and exact description.

This invention relates to pneumatic cushions and more particularly to that type of cushion adapted for use in automobile and other vehicle seats, chairs, and the like.

Cushions of this type as heretofore made are open to the objection that if allowed to become deflated by puncture or otherwise they lose their resiliency and furnish an uncomfortable seat. Such cushions are also objectionable in providing a somewhat unsteady support. This latter feature is noticeable when the occupant positions himself upon the cushion. Wherever pressure is applied air tends to move from that portion of the cushion to a point of lower pressure allowing the cushion to sink in one direction to a considerable depth and making the support provided somewhat unsteady.

One of the objects of the present invention accordingly is to provide a cushion of the kind described which if partially or in whole deflated by leakage or otherwise, shall still furnish a comfortable support. Another object is to provide a cushion of the kind mentioned which shall provide a substantially steady seat.

Figure 1:
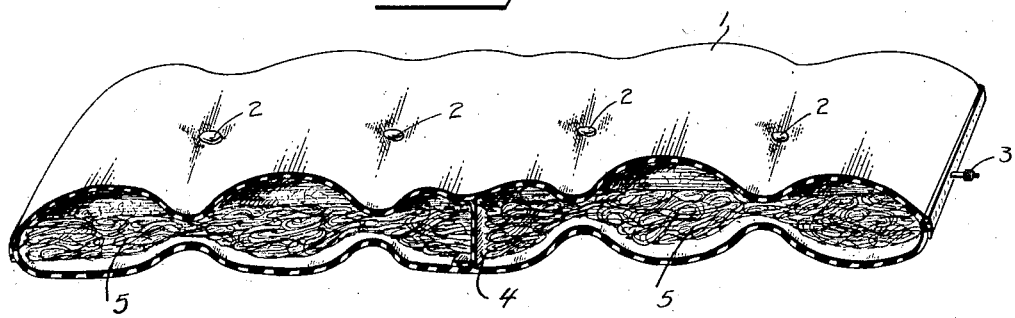
Figure 2:
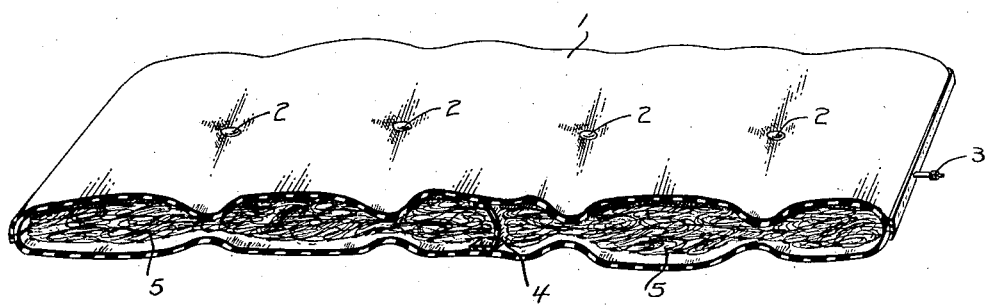

For a detailed description of a preferred form of my invention, reference may be had to the following specification and accompanying drawings forming a part thereof, in which, Figure 1 represents a longitudinal sectional view showing the cushion in inflated condition; and Fig. 2 represents a similar view showing the cushion deflated.

In the drawings, the numeral 1 indicates the cushion which is preferably of rubberized fabric of a generally oblong shape provided with bolts 2 passing through the upper and lower layers thereof providing tufts. A valve 3 at one end of the cushion is adapted to permit the inflation of the cushion. A transverse interior partition 4 is adapted to divide the cushion into two seats.

Lying within the cushion 1 is a mass of compressible, resilient, fibrous material 5 preferably consisting of cocoanut fiber or excelsior. When the cushion is in deflated condition the walls thereof, collapsed as shown in Fig. 2, rest upon this fibrous material and are supported thereby. In inflated condition the material does not entirely fill the space within the cushion, but if the wall is lowered by the pressure of an occupant it will be supported by the material 5 when it comes in contact therewith. By thus limiting the movement of the wall of the cushion a steady seat is provided for the occupant, and in case the air is entirely exhausted by puncture or otherwise, the wall will come to rest upon the fibrous material, which in itself will provide for the occupant a somewhat comfortable support.

The tufts of the cushion serve not only to impede the rapid rush of air therethrough but also serve to hold the cocoanut or other fiber in position.

In use, the cushion may be inclosed in a leather cover or may be used uncovered as shown in the drawings.

Having thus described my invention what I claim as new and desire to protect by Letters Patent is:

A pneumatic seat cushion comprising a flexible air-tight casing, means for inflating the casing, a compressible fibrous cushioning material filling said casing, and means for securing together the opposite walls of the casing and for dividing the fibrous material into sections of comparatively loosely dispersed material surrounded by separating walls of compressed material whereby, when a differential pressure is applied, the movement of the contained air from one section to another in the direction of the lesser pressure will be impeded by the wall of compressed material and the stability of the seat thereby enhanced.

Signed at New York city, New York, this 11th day of May, 1916.

EDWIN S. SYLVESTER.